United States Patent [19]

Earnheart, Jr.

[11] Patent Number: 5,065,694

[45] Date of Patent: Nov. 19, 1991

[54] AUTOMATIC WHITE SIDEWALL SPRAYING APPARATUS

[75] Inventor: William G. Earnheart, Jr., Tupelo, Miss.

[73] Assignee: Cooper Tire and Rubber Co., Findlay, Ohio

[21] Appl. No.: 570,054

[22] Filed: Aug. 20, 1990

[51] Int. Cl.⁵ .............................................. B05C 7/02
[52] U.S. Cl. ................................... 118/669; 118/319; 118/320; 118/321
[58] Field of Search ............... 118/668, 669, 676, 678, 118/320, 321, 323, 324, 319

[56] References Cited

U.S. PATENT DOCUMENTS

| | | | |
|---|---|---|---|
| 1,876,967 | 9/1932 | Krause et al. | 118/320 |
| 2,344,108 | 3/1944 | Roselund | 118/324 |
| 2,930,345 | 3/1960 | Jacobsen et al. | 118/668 |
| 3,594,211 | 7/1966 | Drum | 427/8 |
| 3,999,507 | 1/1976 | Voermans | 118/34 |
| 4,359,897 | 11/1982 | Ugo | 118/669 |
| 4,418,644 | 12/1983 | Young | 118/669 |
| 4,419,384 | 12/1983 | Kane et al. | 118/324 |
| 4,421,800 | 12/1983 | Schoenberg | 118/323 |
| 4,614,164 | 4/1986 | Kato et al. | 118/323 |
| 4,669,417 | 6/1987 | Pederson et al. | 118/320 |
| 4,670,289 | 6/1987 | Miller | 118/669 |
| 4,704,985 | 2/1987 | Rubinstein | 118/316 |
| 4,881,488 | 11/1989 | Fantacci | 118/320 |
| 4,958,587 | 9/1990 | Fogel et al. | 118/321 |

Primary Examiner—Willard Hoag
Attorney, Agent, or Firm—Joseph G. Nauman

[57] ABSTRACT

A device as disclosed for spraying a protective coating onto the white sidewall portion of tires. The apparatus includes a support for supporting a tire for rotation within a predetermined spray area and a spray head mounted above the spray area wherein the spray head may be moved into close proximity to the white sidewall portion of the tire. The spray head includes a pair of sensors for sensing the height of the spray head above the tire and the particular location of the white sidewall portion along the side of the tire. In addition, a pair of motor controlled actuators are provided for moving the spray head in response to signals received from the sensors such that the spray head is accurately positioned prior to the spraying operation.

18 Claims, 4 Drawing Sheets

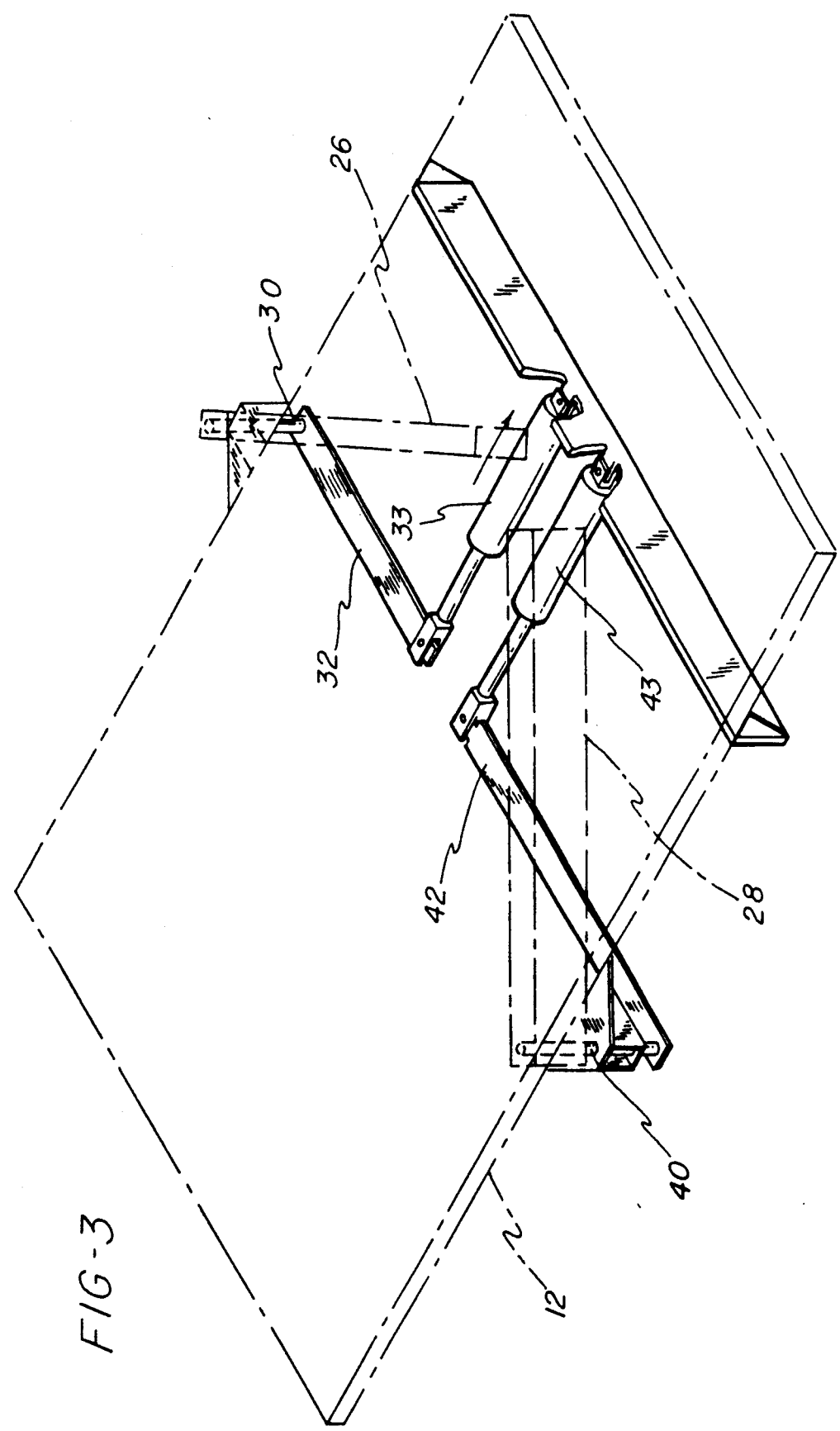

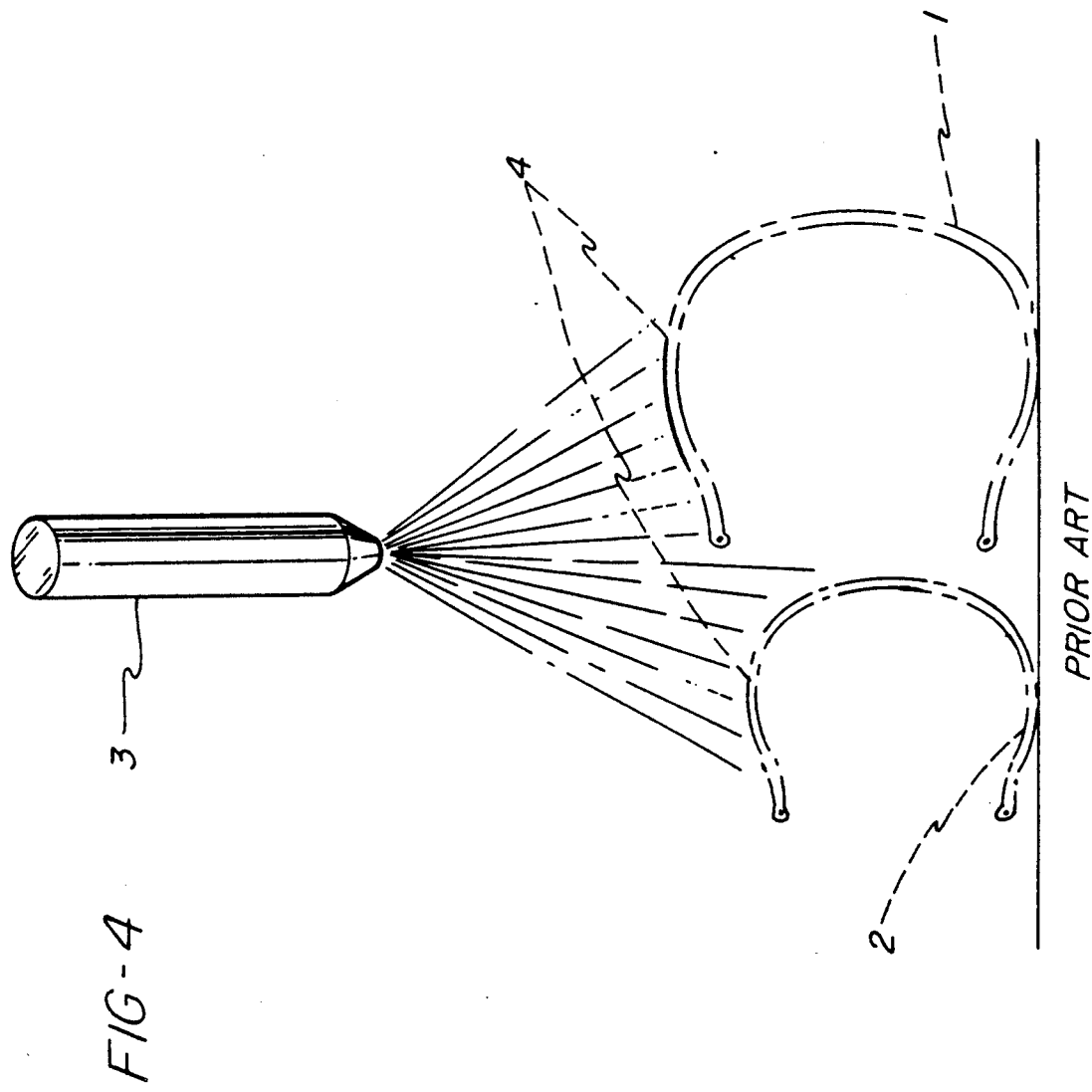

AUTOMATIC WHITE SIDEWALL SPRAYING APPARATUS

BACKGROUND OF THE INVENTION

The present invention relates to an apparatus for applying a protective spray coating to the white sidewall portion of a tire and, more particularly, to a device which minimizes the amount of overspray applied to portions of the tire surrounding the white sidewall.

The white sidewall portion of a tire is typically produced by rotating the tire, which is generally inflated, and engaging the sidewall portion of the tire with a rotating emery wheel in the area where the white sidewall is intended to be produced. The emery wheel grinds away the outer layer of black rubber to expose an underlying white layer of rubber wherein the exposed white rubber forms the white sidewall portion of the tire.

Subsequent to forming the white sidewall, it is necessary to protect the white surface from being marked or soiled during handling, such as might occur through contact with the black rubber portion of adjacent tires. The white sidewall portions of tires were formerly protected by wrapping the tires with a paper tape, and more recently have been protected by spraying a coating such as a water soluble soap, which is generally tinted blue or green, onto the white sidewall portion as the tire is rotated under a spray nozzle.

As illustrated in FIG. 4, the prior art machines which have been produced to spray a coating onto tire sidewalls have generally been designed to spray a variety of tire sizes 1, 2 that reach a tire spraying station at random. Unfortunately, such devices typically locate the spray nozzle 3 in a fixed position high enough to accommodate the largest and smallest diameter tires 1, 2 which are to be sprayed and disperse the spray in a diverging pattern in order to insure that the entire white sidewall portion 4 of any tire being sprayed is completely coated.

Such machines produce huge amounts of overspray which cause product appearance problems and which also are wasting the greater amount of paint being sprayed through the nozzle by directing them and applying them to portions of tires which do not require spray paint protection.

Therefore, an apparatus is needed for applying a protective coating to the white sidewall portions of tires wherein the device may randomly receive tires having different diameters and accurately limit the spraying of the protective coating to the white sidewall portion of the tires such that the amount of overspray beyond the white sidewall portion of the tires is minimized.

SUMMARY OF THE INVENTION

The present invention provides a spraying station for coating the white sidewall portion of different sized tires as they arrive randomly at the station.

The spraying station includes an entry and an exit end for receiving and discharging tires, respectively. An inclined support surface extends from the entry to the exit end and includes a plurality of ball transfer bearings in the upper surface thereof for conveying tires through the station. The support surface is inclined downwardly from the entry to the exit end whereby tires may slide downwardly through the station when coming into contact with the ball transfer bearings that form the upper surface of the support.

An elongated drive arm having a motor driven belt is attached at one end thereof to an outer edge of the support surface by pivot means whereby an opposite end of the drive arm may pivot toward the center of the support surface.

An elongated idler arm is mounted opposite from the drive arm and includes means for engaging a tire positioned for engagement with the drive arm. The idler arm is attached at one end thereof to an outer edge of the support surface by pivot means such that an opposite end of the idler arm may pivot toward the center of the support surface. Means are provided for pivoting the drive and idler arms into angled relationship toward each other to position a tire in a predetermined spray location on the support surface.

In addition, a kicker arm is pivotally mounted to the idler arm near the pivot point for the idler arm whereby the kicker arm may engage a portion of the tire opposite from the drive arm to force the tire into engagement with the drive belt. With the tire in engagement with the drive belt, the tire will rotate in a spray location on the support surface about a rotational axis substantially perpendicular to the support surface.

A frame including first and second frame members located at the entry and exit, respectively, of the spray station supports an elongated spray head support structure which extends along the length of the spray station. The elongated support structure includes a pair of rails for guiding a spray head in movement transverse to the rotational axis of the tire and is pivotally connected to the first frame member at one end of the rails such that the opposite end of the rails and the spray head may be moved toward and away from the tire. A first actuating motor is mounted to the second frame member for pivoting the rails and spray head toward and away from the tire located in the predetermined spray location and a second actuating motor is provided for moving the spray head along the rail means.

The spray head includes a first light sensitive sensor for sensing the location of the white sidewall portion of a tire and an ultrasonic sensor for sensing the distance from the spray head to the sidewall of a tire, and control means are provided for causing the actuating motors to move the spray head into position over the white sidewall portion of a tire in response to signals received from the sensors. In addition, a second light sensitive sensor is positioned for sensing movement of a tire through the entrance to the spray station whereby an input signal from the second light sensitive sensor causes the control means to initiate a tire spraying operation and position the spray head adjacent to the white sidewall portion of the tire.

Thus, the present invention provides a device whereby a spray head may be automatically positioned adjacent to the white sidewall portion of a tire to be coated such that the amount of overspray resulting from the coating operation is drastically eliminated. In addition, the present invention provides a device wherein a variety of tire sizes may be received and the spray head may be accurately positioned to the location of the white sidewall portion of the particular tire received.

After the spraying operation has been completed, the spray head retracts to thereby provide room for the coated tire to exit the spraying station and for the next tire to enter.

Other objects and advantages of the invention will be apparent from the following description, the accompanying drawings and the appended claims.

BRIEF DESCRIPTION OF THE DRAWINGS

FIG. 3 is a perspective view showing the actuating means for pivoting the drive and idler arms of the spray station; and FIG. 4 is an elevational diagrammatic view of a prior art spraying operation.

DETAILED DESCRIPTION OF THE PREFERRED EMBODIMENT

Figure 1:
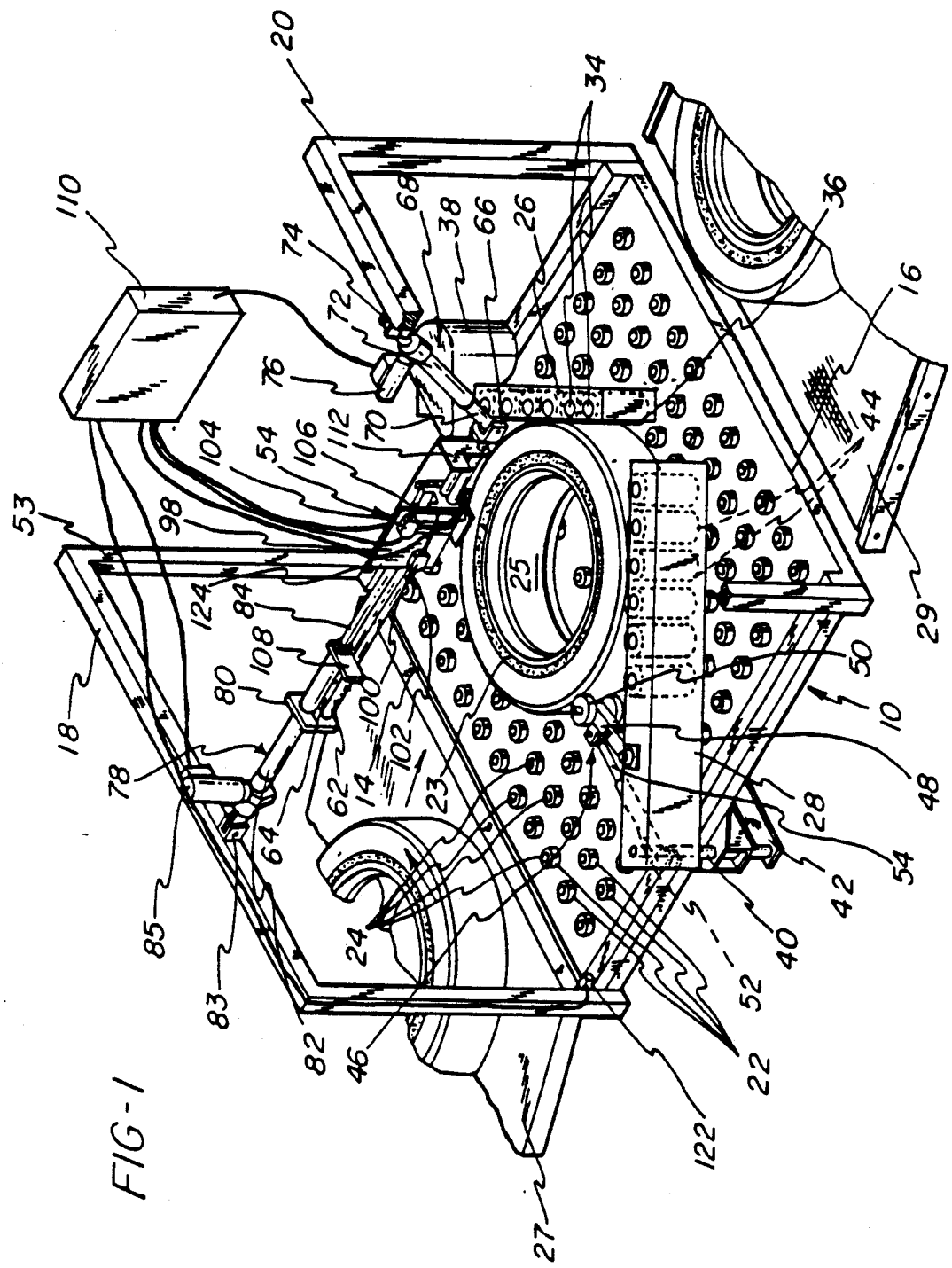
FIG. 1 is a perspective view of the spray station of the present invention.

Referring to FIG. 1, the spray station 10 of the present invention includes a support table 12 which is oriented at a slight slope from an inlet end 14 to an outlet end 16. A frame is provided for supporting a spray apparatus in position over the support table 12 and includes a first frame member 18 located at the inlet 14 to the station 10 and a second frame member 20 located at the outlet end 16 of the station 10. The first and second frame members 18, 20 surround and are attached to the support table 12 to form a rigid frame structure for the spray station 10.

The support table 12 is formed with a plurality of short support cylinders 22 extending from an upper surface thereof. Each of the support cylinders 22 includes a rotatable ball transfer bearing 24 positioned to extend from an upper portion thereof whereby the support cylinders 22 form a conveying surface to support a tire 23 as it passes through the spray station. The ball transfer bearings 24 of the support cylinders 22 form low friction support means for the tire 23 such that a tire entering the spray station 10 will freely slide along the length of the support table 12 toward the exit end 16 of the spray station 10 by virtue of the incline at which the table 12 is oriented.

Tires 23 having white sidewall portions 25 may be supplied to the spray station 10 from a supply conveyor 27 which conveys tires of various sizes past the spray station 10 in a direction perpendicular to the path followed by tires 23 passing from the inlet end 14 to the outlet end 16 of the station 10. A mechanism (not shown) for directing tires from the supply conveyor 27 onto the support table 12 may be provided adjacent to the inlet end 14 of the station 10 whereby tires may be selectively diverted off of the supply conveyor 27 and onto the support table 12 when the spray station 10 is empty.

A discharge conveyor 29 may be positioned at the outlet end 16 of the spray station 10 opposite from the supply conveyor 27. The discharge conveyor 29 receives tires 23 as they are discharged off of the support table 12 and conveys them away from the spray station 10.

The spray station 10 further includes a drive roller arm 26 and an idler roller arm 28 for positioning and causing a tire 23 to rotate within the spray station 10. The drive arm 26 is attached at one end to an outer edge of the support table 12 by pivot means 30 (see FIG. 3). The opposite end of the drive arm 26 is located adjacent to the outlet end 16 of the spray station 10 and may be pivoted toward and away from the center of the spray station 10 by a lever 32 which is attached to an end of the pivot means 30 and actuated by a pneumatic cylinder 33 attached to the bottom of the table 12, as shown in FIG. 3.

A plurality of rollers 34 are mounted vertically within the arm 26 for supporting a drive belt 36 for movement along the length of the drive arm 26. The rollers 34 are positioned such that one surface of the belt 36 extends toward the center of the support table 12 beyond the longitudinal edges of the drive arm 26. The drive belt 36 is driven for movement relative to the pivot arm 26 by means of a motor 38 which is connected to the drive belt 36 by conventional drive means adjacent to the pivot means 30. It should be noted that the motor 38 and associated drive means may be mounted to and pivot with the arm 26 about the pivot means 30.

The idler arm 28 is mounted for pivotal movement by pivot means 40 located adjacent to an outer edge of the support table 12 opposite from the pivot means 30 for the drive arm 26. A lever 42 is connected to the pivot means 40 and is actuated by a pneumatic cylinder 43 for moving the free end of the idler arm 28 toward and away from the center of the support table 12. The idler arm 28 further includes a plurality of freely rotatable rollers 44 mounted along the length thereof.

Thus, the drive arm 26 and idler arm 28 may be pivoted toward each other such that a tire 23 may be accurately located at a predetermined location to define a spray area for coating the white sidewall portion of the tire 23. In addition, a kicker arm assembly 46 is mounted to the idler arm 28 adjacent to the pivot means 40 for engaging a tire 23 and biasing it into contact with the drive and idler arms 26, 28.

The kicker arm assembly 46 includes a pivot arm 48 which is pivotally mounted at one end thereof to the idler arm 28 and has a roller 50 rotatably mounted at an opposite end thereof. A pneumatic cylinder 52 is pivotally mounted to the idler arm 28 adjacent to the pivot means 40 and includes a piston portion 53 which is connected to the pivot arm 48 adjacent to the roller 50.

The cylinder 52 acts to pull the pivot arm 48 and roller 50 back toward the idler arm 28 to allow a tire 23 to enter the spray area and subsequently, force the roller 50 into contact with the tire 23 on a diametrically opposite side from the drive arm 26 to force the tire 23 into contact with the drive belt 36 and rollers 44. With the tire 23 thus in position within the spray area, the motor 38 may be actuated to drive the belt 36 and rotate the tire 25 about a rotational axis 53 substantially perpendicular to the support table 12.

A spray assembly is supported over the support table 12 by the frame members 18, 20 and includes a spray head 54 which is mounted for two degrees of movement, one in a longitudinal direction along the length of the spray station 10 and another toward and away from the support table 12. As may be seen with reference to FIGS. 1 and 2, the spray head 54 includes a mounting block 56 having a pair of apertures 58, 60 extending longitudinally therethrough for receiving a pair of support rails 62, 64. The rails 62, 64 are attached at one end thereof to a pivot block 66 which is mounted to a first telescoping vertical actuator assembly 68.

The vertical actuator assembly 68 includes an inner telescoping tube 70 attached to the pivot block 66 and an outer housing tube 72 for receiving the inner tube 70 in telescoping relationship. The outer tube 72 is pivotally attached to the second frame member 20 at an end 74 opposite from the inner tube 70. A motor 76 is mounted to the outer tube adjacent to the pivot 74 to cause the inner tube 70 to move into and out of the outer tube 72 through a known ball screw/nut drive mechanism. The actuator assembly 68 may be of a conventional type which is commercially available such as a Duff-Norton Mini-Pac Actuator which is available from Duff-Norton Company of Charlotte, N.C.

The ends of the rails 62, 64 opposite from the pivot block 66 are attached to a second actuator assembly 78 by means of a connecting block 80 which connects the rails 62, 64 adjacent to a first end of an outer tube portion 82 of the second actuator assembly 78. A second end of the outer tube 82 is pivotally attached to the first frame member 18 at a pivot point 83, and the outer tube 82 is oriented along a line substantially parallel to the rails 62, 64.

The second actuator assembly 78 further includes an inner tube 84 which is telescopingly received within the outer tube 82, and a motor 85 is mounted on the outer tube 82 for moving the inner tube 84 into and out of the outer tube 82 in a manner similar to that of the first actuator assembly 68.

Figure 2:
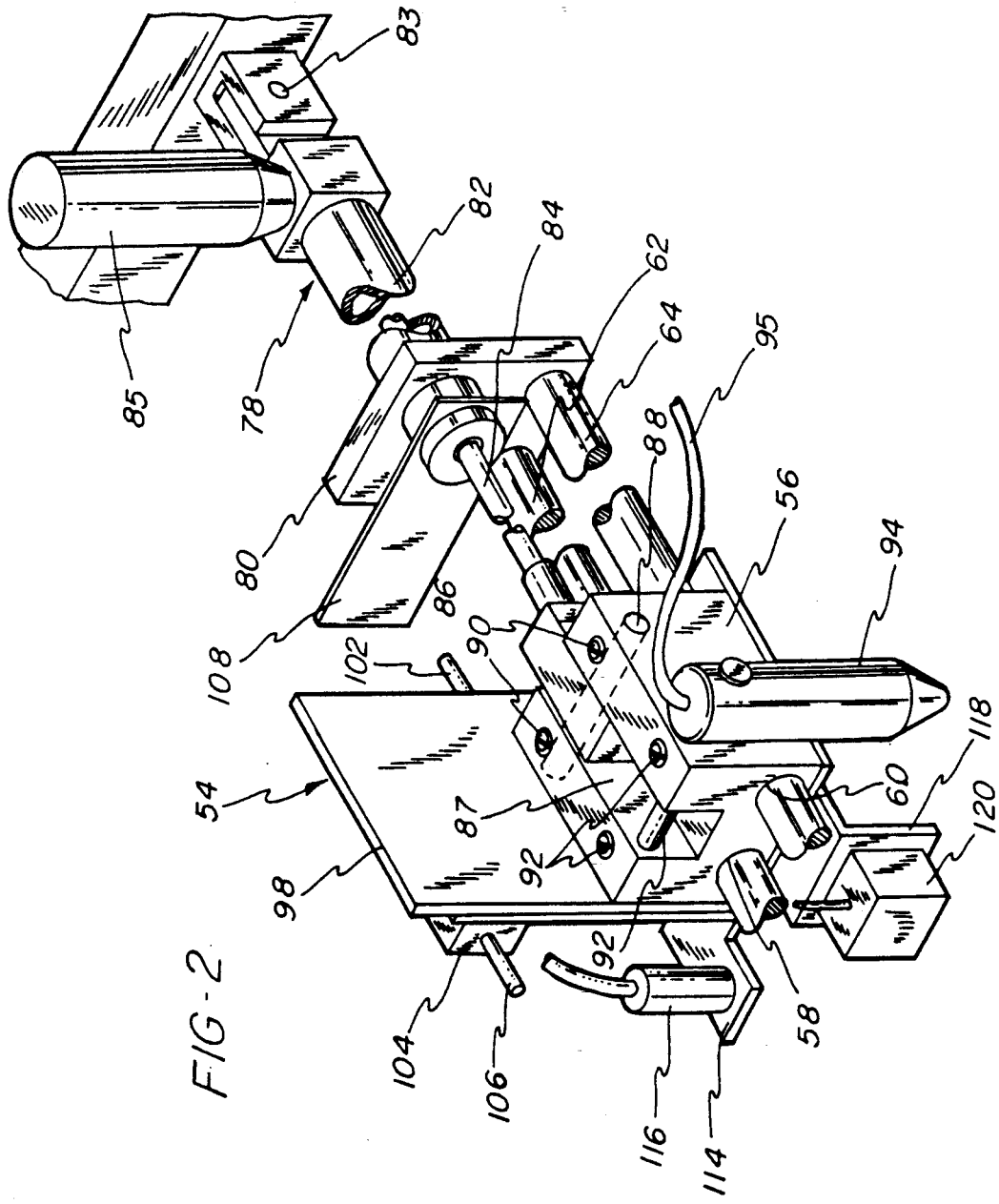
FIG. 2 is a perspective view showing details of the spray head assembly.

As may be seen in FIG. 2, the end of the inner tube 84 extending from the outer tube 82 is connected to a drive block 86 mounted on the mounting block 56. The mounting block 56 is provided with a channel 87 which is centrally located and extends along the length of the upper portion of the mounting block 56 for receiving the drive block 86 at a rearmost portion thereof. A first rod 88 extends through the mounting block 56 and pivot block 86 and is held in place on the mounting block 56 by a pair of set screws 90. The rod 88 is slidably received through the drive block 86 and rigidly holds the drive block 86 in position relative to the mounting block 56 such that as the inner tube 84 is extended and retracted relative to the outer tube 82, the mounting block 56 is caused to move forwardly and rearwardly along the rails 62, 64.

A second rod 92 extends across the mounting block 56 parallel to the first rod 88 and includes an end extending out beyond one side of the mounting block 56 to engage a spray nozzle 94 which is supplied with a fluid to be sprayed on the tires via a hose 95. The end of the rod 92 is rigidly attached within an aperture of the spray nozzle 94 and the orientation of the nozzle 94 relative to the mounting block 56 may be adjusted by means of set screws 96 which are positioned to lock the rod 92 in a desired rotational position.

A limit switch mounting plate 98 is attached to the mounting block 56 and extends along a side thereof opposite from the spray nozzle 94. Referring to FIG. 1, a first limit switch 100 is mounted adjacent to a rear edge of the mounting bracket 98 and includes a plunger member 102 extending rearwardly beyond the rearwardmost edge of the mounting bracket 98. A second limit switch 104 is mounted adjacent to a forward edge of the mounting bracket 98 and includes a plunger 106 extending beyond the forwardmost edge of the bracket 98.

A first limit switch contact plate 108 is attached to the outer tube 82 of the first actuator assembly 78 for contacting the plunger 102 of the first limit switch 100 to thereby cause the plunger 102 to move into the switch 100 and send a signal to a control means 110 for indicating that the spray head 54 is in a fully retracted or home position.

A second limit switch contact plate 112 is positioned adjacent to the pivot block 66 for contacting the plunger 106 on the second limit switch 104. Thus, when the spray head 54 has moved forwardly to an overtravel position, the plunger 106 will contact the plate 112 to push the plunger 106 into the switch 104 whereby a signal is sent to the control means 110 to indicate that the spray head 34 is at its forwardmost or overtravel position.

A first sensor mounting bracket 114 is mounted to the side of the limit switch mounting bracket 98 and supports a first distance sensing sensor 116. The sensor 116 may be in the form of an ultrasonic senor directed downwardly to sense the distance from the spray head to a tire 23 positioned within the spray area. The distance sensor 116 is connected to the control means 110 and provides input signals to control actuation of the first actuator 68 in a spray head positioning operation to be described below.

A second sensor mounting bracket 118 is mounted to a lower portion of the mounting block 56 and supports a second sensor 120. The sensor 120 is provided for sensing the white sidewall portion 25 of the tire 23 and for distinguishing it from the surrounding black portion of the tire. The sensor 120 may be in the form of a proximity sensor which incorporates a photocell for sensing different levels of light reflected from the tire surface whereby the sensor 120 will be able to determine when the spray head 54 is in position over the white sidewall portion 25 of the tire 23. The proximity sensor 120 is also connected to the control means 110 to provide inputs for controlling actuation of the second actuator 78.

An additional sensor 122 is mounted to the support table 12 adjacent to the inlet end 14 for sensing the entry of a tire 23 into the spray station 10. The sensor 122 may be in the form of a unit containing a light source and a photoelectric cell, and a reflector unit 124 may be positioned on the support table 12 opposite from the sensing unit 122 such that, as a tire passes between the sensing unit 122 and the reflector 124, the light to the photocell of the unit 122 is interrupted and the sensor unit 122 signals the control means 110 to indicate that a tire 23 has entered the spray station 10.

Thus, the control means 110 receives input signals from the limit switches 100, 104, the ultrasonic sensor 116, the proximity sensor 120, and the sensor 122 at the inlet 14 to the spray station 10. The control means 110 may be in the form of a conventional microprocessor which may be programmed to receive and process the input signals in a manner known in the art. In addition, the control means 110 provides output signals to actuate the first and second motors 76, 85, the actuating cylinders 33, 34, the kicker bar cylinder 52 and the motor 38 for the belt 36 on the drive arm 26, as well as to means for controlling the flow of coating material to the spray nozzle 94.

In operation, tires 23 are conveyed along the supply conveyor 27 past the inlet 14 to the spray station 10. When the spray station 10 is empty, a tire 23 is diverted from the supply conveyor 27 onto the cylinder and roller assemblies 22, 24 and the incoming tire 23 will slide down the support table 12 and move into contact with the drive belt 36 on the drive arm 26 and the rollers 44 on the idler arm 28. As the tire 23 passes through the inlet 14 it will activate the sensor 122 which will then signal the control means 110 to begin the spraying operation which includes moving the roller 50 into position behind the tire 23 to hold it in contact with the belt 36 and rollers 48 whereby the tire 23 is prevented from being kicked out as the belt 36 causes it to rotate.

After the kicker roller 50 is in position, the control means 110 activates both of the actuator motors 76, 85 to simultaneously move the spray head 54 downwardly and forwardly along the rails 62, 64. As the actuator assemblies 68, 78 move the spray head 54 into position over the tire 23, the ultrasonic sensor 116 and proximity sensor 120 send signals to the control means 110 as they sense the height of the spray head 54 and its proximity to the whitewall portion 25 of the tire 23.

The first actuator 68 will extend the inner tube 70 downwardly to pivot the rails 62, 64 and spray head 54 toward the tire 23 until the desired distance between the spray head 54 and the tire 23 is sensed. Similarly, the second actuator 78 will extend the inner tube 84 toward the outlet 16 of the spray station 10 and thereby move the spray head 54 longitudinally through the spray area until the proximity sensor 120 senses the light colored whitewall portion 25 of the tire 23.

With the spray head 54 thus properly positioned, the control means 110 will activate the motor 38 to cause the drive belt 36 to rotate the tire 23 about its axis and the control means 110 will activate the spray nozzle 94 through conventional means such as a solenoid actuated valve (not shown) to cause the spray head 54 to spray a coating on the white sidewall portion 25 of the tire 23.

After the entire white sidewall portion 25 of the tire 23 has been coated, the control means 110 will cause the pneumatic cylinders 33, 34 to pivot the drive and idler arms 26, 28 away from each other toward the sides of the support table 12 to thereby allow the coated tire 23 to pass out of the spray station 10 and onto an outfeed conveyor 29. Also, the control means 110 will cause the first actuator 68 to retract the inner tube 70 into its uppermost position and the actuator 78 will retract the inner tube 84 and the spray head 54 back until the plunger 102 contacts the contact plate 108 thereby actuating the limit switch 100 to signal the control means 110 that the spray head 54 has returned to its home position and is ready for another spraying operation.

It should be noted that if a tire which does not have a white sidewall portion enters the spray area, the proximity sensor 120 will not signal the control means 110 to deactivate the second actuator motor 85 and the spray head 54 will advance forwardly until the plunger 106 contacts the contact plate 112 thereby actuating the limit switch 104 and signal the control means 110 that the spray head 54 has reached its forwardmost or overtravel position. When the control means 110 receives a signal from the limit switch 104, it will terminate the spray operation and will cause the actuator assemblies 68, 78 to retract their inner tubes 70, 84 back to the home position and will release the tire 23 located in the spray area without spraying it with a coating.

It should be apparent that the present invention provides a device for accurately coating only the white sidewall portions of a tire while limiting the amount of overspray onto adjacent portions of the tire. In addition, the present device provides means for sensing the presence of a tire which does not include a white sidewall portion and passing the tire out of the device without performing a spraying operation.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. A device for spraying a coating on the white sidewall portion of tires comprising:
    frame means;
    conveying means attached to said frame means for conveying a tire into a predetermined location in said device;
    rail means supported by said frame means and located over said conveying means;
    a spray head mounted on said rail means for spraying a coating on a tire located in said predetermined location;
    actuating means connected to said spray head for moving said spray head relative to said frame means; and
    sensor and control means such as to locate the white sidewall portion of a tire and to control said actuating means to precisely position said spray head over the white sidewall portion to spray a coating thereon.

2. The device of claim 1 wherein said rail means includes an elongated rail supported at one end thereof to said frame means by pivot means such that said rail may pivot relative to said frame to move said spray head toward and away from a tire in said predetermined location.

3. The device of claim 1 wherein said conveying means includes an inclined surface supporting a plurality of ball bearings for engaging a tire entering said device.

4. The device of claim 1 wherein said spray head is mounted for at least two degrees of movement relative to a tire positioned in said predetermined location.

5. The device of claim 1 wherein means are provided for rotating a tire positioned in said predetermined location under said spray head such that a coating may be applied circumferentially to the white sidewall portion of the tire.

6. The device of claim 1 wherein said sensor and control means include a photocell and an ultrasonic sensor for sensing the position of the white sidewall portion of a tire in said predetermined location.

7. The device of claim 1 wherein said actuating means include means for causing said spray head to be moved substantially parallel to and substantially perpendicular to said conveying means whereby said spray head may be precisely positioned.

8. A device for spraying a coating onto the white sidewall portion of tires comprising:
    support means for supporting a tire in a predetermined location for rotation about a rotational axis extending through the center of the tire;
    a spray head for spraying a coating on the sidewall of a tire supported by said support means, said spray head being mounted for movement relative to said support means;
    first actuating means for moving said spray head in a direction substantially parallel to said rotational axis;
    second actuating means for moving said spray head in a direction substantially transverse to said rotational axis;
    a first sensor for sensing the location of the white sidewall portion of a tire in said predetermined location;
    a second sensor for sensing the distance from said spray head to the sidewall of a tire in said predetermined location; and control means for controlling movement of said spray head in response to inputs from said first and second sensors whereby said spray head is aligned closely adjacent to the white sidewall portion of a tire in said predetermined location to limit overspray of a coating applied by said spray head to the white sidewall portion.

9. The device of claim 8 including at least one guide rail for guiding said spray head in movement transverse to said rotational axis wherein said first actuating means includes means for moving said at least one guide rail toward and away from said support means.

10. The device of claim 8 wherein said first and second actuating means include first and second telescoping tube assemblies.

11. The device of claim 8 wherein said first sensor includes a photocell for sensing light reflected from the white sidewall portion of a tire located in said predetermined location.

12. The device of claim 8 wherein second sensor includes an ultrasonic sensor for sensing the distance between said spray head and a tire in said predetermined location.

13. The device of claim 8 including drive means for causing a tire in said predetermined location to rotate about said rotational axis.

14. The device of claim 13 including a cylinder actuated arm located on a diametrically opposite side of a tire in said predetermined location from said drive means for forcing the tire into contact with said drive means.

15. The device of claim 8 including means for sensing a tire entering said device to signal said control means to position said spray head for a spraying operation.

16. The device of claim 8 including a drive arm and an idler arm and means for pivoting said drive and idler arms into angled relationship toward each other to position a tire in said predetermined location beneath said spray head, said drive arm including means for causing a tire to rotate about said rotational axis and said means for pivoting said drive and idler arms acting to pivot said arms away from each other to allow a tire to pass out of said device at the conclusion of a spraying operation.

17. The device of claim 8 wherein said first and second sensors are mounted for movement with said spray head.

18. A device for spraying a coating onto the white sidewall portion of tires comprising:
  a frame;
  a support located within said frame for supporting a tire for rotation about a rotational axis extending through the center of the tire;
  an elongated drive arm having a motor and a belt element for engaging and causing a tire to rotate upon said support, said drive arm being attached at one end thereof to an outer edge of said support by pivot means whereby an opposite end of said drive arm may pivot toward the center of said support;
  an elongated idler arm including means for engaging a tire positioned for engagement with said drive arm, said idler arm being attached at one end thereof to an outer edge of said support by pivot means whereby an opposite end of said idler arm may pivot toward the center of said support;
  means for causing said drive and idler arms to pivot inwardly toward and outwardly away from each other, said drive and idler arms defining a tire spraying area therebetween when positioned in an inwardly pivoted position;
  a spray head for spraying a coating on the sidewall of a tire supported by said support and including a first light sensitive sensor for sensing the location of the white sidewall portion of a tire located in said tire spraying area and an ultrasonic sensor for sensing the distance of said spray head from the sidewall of a tire located in said spraying area;
  a kicker bar mounted for pivotal movement relative to said idler arm adjacent to said idler arm pivot means, said kicker bar including means for engaging a tire located in said spraying area to maintain the tire in contact with said drive and idler arms;
  cylinder means for moving said kicker bar toward and away from said tire spraying area;
  an elongated support structure extending across said spraying area for supporting said spray head and including rail means for guiding said spray head in movement transverse to the rotational axis of a tire in said spraying area and a pivot connection adjacent to one end of said rail means connecting said elongated support structure to said frame for allowing said spray head to move toward and away from said horizontal support;
  a first actuating motor for pivoting said rail means about said pivot connection to move said spray head toward and away from said support;
  a second actuating motor for moving said spray head along said rail means;
  a second light sensitive sensor positioned for sensing movement of a tire into said tire spraying area; and
  control means for controlling a spraying operation in response to input signals from said sensors wherein said spraying operation is initiated in response to a tire passing said second light sensitive sensor and entering said tire spraying area, and said spray head is positioned over the white sidewall portion of the tire in response to input signals from said first light sensitive sensor and said ultrasonic sensor.

* * * * *